United States Patent
Dorr

[11] Patent Number: 5,752,780
[45] Date of Patent: May 19, 1998

[54] BALL-AND-SOCKET JOINT

[75] Inventor: Christoph Dorr, Meerbusch, Germany

[73] Assignee: TRW Fahrwerkesystem GmbH & Co. KG, Dusseldorf, Germany

[21] Appl. No.: 745,433

[22] Filed: Nov. 12, 1996

[30] Foreign Application Priority Data

Nov. 11, 1995 [DE] Germany .............. 195 42 071.3

[51] Int. Cl.$^6$ .................................. F16C 11/10
[52] U.S. Cl. ................. 403/135; 403/140; 403/122
[58] Field of Search ................ 403/135, 136, 403/137, 138, 140, 143, 144, 131, 132, 133, 122

[56] References Cited

U.S. PATENT DOCUMENTS

| | | |
|---|---|---|
| 3,545,797 | 12/1970 | Korecky . |
| 3,574,368 | 4/1971 | Songer ................ 403/133 X |
| 4,880,329 | 11/1989 | Sakai ................. 403/135 X |
| 4,883,263 | 11/1989 | Buhl ................. 403/133 X |
| 5,230,580 | 7/1993 | Henkel ................ 403/135 |
| 5,395,176 | 3/1995 | Zivkovic ............. 403/122 |

FOREIGN PATENT DOCUMENTS

| | | | |
|---|---|---|---|
| 428064 | 5/1991 | European Pat. Off. ....... 403/135 |
| 709337 | 5/1931 | France ................. 403/133 |
| 2443091A1 | 3/1976 | Germany . |
| 4109697 | 6/1992 | Germany . |
| 3821786 | 5/1995 | Germany . |
| 4338916 | 5/1995 | Germany . |
| 6235417 | 8/1994 | Japan ................. 403/132 |
| 886571 | 1/1962 | United Kingdom ....... 403/133 |

*Primary Examiner*—Harry C. Kim
*Attorney, Agent, or Firm*—Tarolli, Sundheim, Covell, Tummino & Szabo

[57] ABSTRACT

The invention pertains to a ball-and-socket joint, in particular, for a motor vehicle, having a ball pivot (1), the coupling ball (1b) of which is supported, by a bearing shell (2), in a joint housing (3) in a tilting sense, such that it can be twisted and tilted to a limited extent, with the bearing shell (2) being fixed in the joint housing (3) by a lock ring (6). For a simple design and a mechanizable assembly, even with the use of a plastic joint housing, for an axial tensile load on the ball pivot (1), a lock ring (6) is formed with a double-leg cross section, the radial inner leg (6a) of which forms a support surface for the section (2b) of the bearing shell (2) between the equator (1e) and the opening for the ball pivot (1) and the radial outer leg (6b) of which, in a mounted state, is supported at the edge of its free end (6d) by an approximately radial annular surface (3e) which is formed by an undercut in the joint housing (3).

8 Claims, 2 Drawing Sheets

BALL-AND-SOCKET JOINT

BACKGROUND OF THE INVENTION

The invention pertains to a ball-and-socket joint which is intended, in particular, for a motor vehicle, and which has a ball pivot, the coupling ball of which is supported by means of a bearing shell, preferably of plastic, in a joint housing in a tilting sense, such that it can be twisted and tilted to a limited extent, with the bearing shell being fixed in the joint housing by means of a lock ring.

Ball-and-socket joints of this type are known in several forms, wherein the lock ring which localizes the bearing shell in the joint housing is held by means of being flattened down or by means of wedging.

The underlying purpose of the invention is to improve a ball-and-socket joint of the aforementioned type in such a way that for a simple design and a mechanizable assembly, a high level of strength results, even with the use of a plastic joint housing, for an axial tensile load on the ball pivot.

SUMMARY OF THE INVENTION

The solution of this problem definition by means of the invention is characterized by the fact that a lock ring, preferably composed of metal, is designed with a double-leg cross section, the radial inner leg of which forms a supporting surface for the section of the bearing shell between the equator and the opening for the ball pivot, and the radial outer leg of which, in a mounted state, is supported at the edge of its free end by an approximately radial annular surface which is formed by means of an undercut in the joint housing.

This design of the lock ring in accordance with the invention causes a reliable localizing of the bearing shell in the joint housing with the use of simple components, with the lock ring, essentially, taking over two functions. First, it serves, with its radial inner leg, as a support surface for that section of the bearing shell which surrounds the ball pivot between the equator of the latter and the opening which is provided for the ball pivot under the consideration of a maximum tilting angle. Moreover, the radial outer leg of the lock ring causes a reliable localizing of a bearing shell in the joint housing since this leg, in a mounted state, is supported by means of the edge of its free end by an approximately radial annular surface which is formed by means of an undercut in the joint housing. For a tensile load of a ball pivot in an axial sense, this results in a holding force which increases with the load, such that a ball-and-socket joint improved in accordance with the invention, composed of individual parts which are few in number and economical to produce, can be used both as a radial joint and as an axial joint, even with the use of a joint housing produced of plastic.

In accordance with an additional feature of the invention, an annular stop face for the crown or bridge region of the double-leg lock ring is developed in the joint housing, and in fact, preferably in the region of the equator of the bearing shell. This annular stop face results in a defined position of the lock ring within the joint housing, such that a simple assembly of the ball-and-socket joint is possible with economical assembly machines.

A lock ring, preferably composed of metal, can be of a design with V-shaped or U-shaped cross section with divergent legs which start from a bridge. In both cases the radial inner leg serves as a support surface for the bearing shell and the radial outer leg, with the edge of its free end, provides for a reliable localizing of the lock ring and, because of that, of the bearing shell in the joint housing.

In this connection, the outer leg of the lock ring is able to deform elastically such that during assembly, because of its resilient properties, the edge of its free end is supported automatically by an annular surface formed by means of an undercut in the joint housing. Alternatively, the outer leg of the lock ring is also able to undergo plastic deform, such that, when the lock ring is inserted in the joint housing, the outer lying leg can be expanded in such a way that the edge of its free end is supported by the annular surface in the joint housing. In order to increase its ability to be deformed or its elasticity, the outer leg of the lock ring can have at least one groove.

The invention proposes, in addition, to develop the bearing shell in the region of the equator, with a flange ring which stands out in a radial sense, for a localizing between the joint housing and the lock ring. With the aid of the lock ring, this carries out a localizing of the bearing shell in the joint housing, said localizing is secured against twisting and tilting. If at least one side of the flange ring is provided, in accordance with an additional feature of the invention, with a tolerance compensation bead, then the demands on the precision of the individual parts can be decreased simultaneously, since the deformation of this bead compensates for present tolerances.

The joint housing of a ball-and-socket joint improved in accordance with the invention is preferably produced from a suitable plastic. In order to be able to produce an approximately radial annular surface economically, which serves as a limit stop for the edge of the free end of the radial outer leg of the lock ring, in the form of an undercut in the joint housing, the invention finally proposes that this annular surface be divided into several annular surface sections, separately spaced, such that it is possible to remove the joint housing from an injection mold easily.

BRIEF DESCRIPTION OF THE DRAWINGS

The figures represent one embodiment of a ball-and-socket joint in accordance with the invention. Shown are.

DESCRIPTION OF PREFERRED EMBODIMENTS

Figure 1:
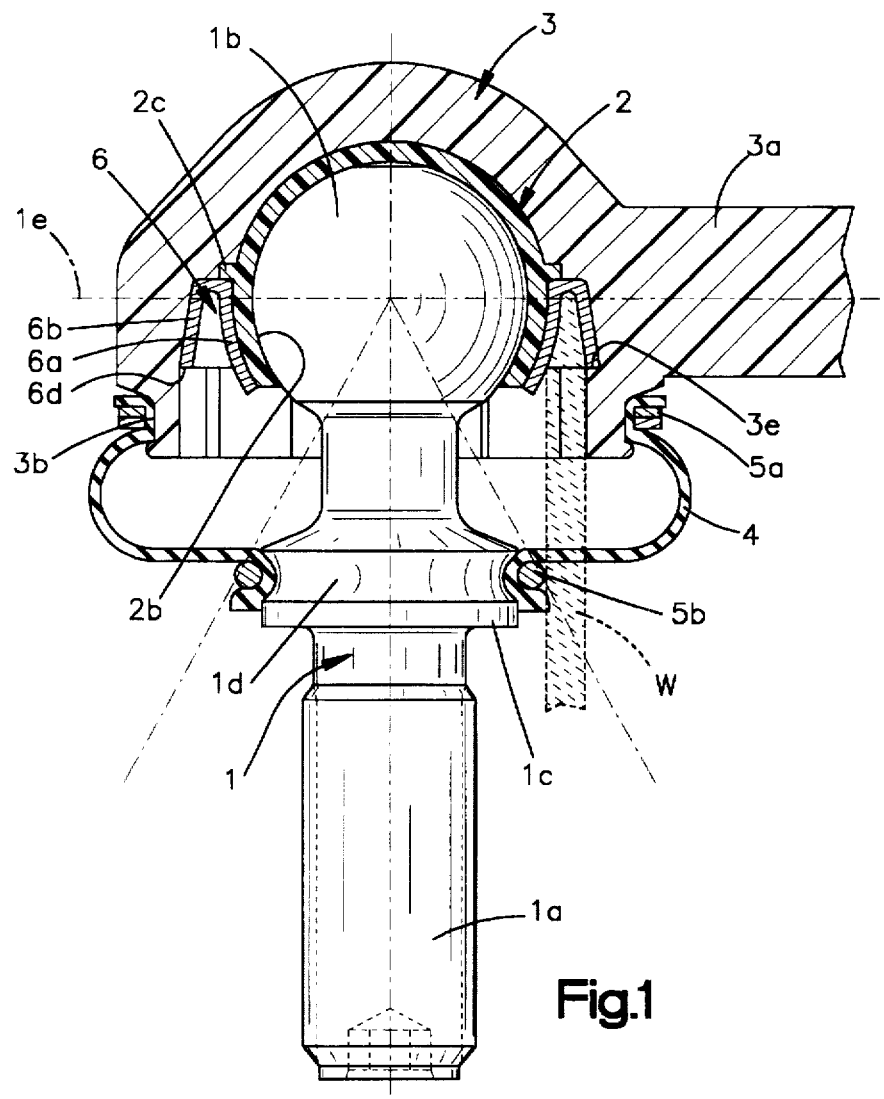
FIG. 1: An axial section through a ball-and-socket joint.

A ball-and-socket joint which is intended, in particular, for use with a motor vehicle, and which has a ball pivot (1) which is fastened, by means of a threaded stem (1a), to a part of the wheel suspension or steering mechanism of a motor vehicle and which, by means of a coupling ball (1b), is supported in a tilting sense, by means of a bearing shell (2,), in a joint housing (3), such that it can be twisted and tilted to a limited extent. In the embodiment, a joint housing (3) in accordance with the representation, formed from plastic, is formed at the end of an undercarriage strut (3a).

For the embodiment, the ball pivot (1) is designed with a flange (1c) of an enlarged diameter in the region between the coupling ball (1b) and the threaded stem (1a); a channel (1d) is developed in the lateral area of the flange (s1c) in order to localize the end of a sealing boot (4) on the side of the stem. The end of the sealing boot (4) on the housing side is localized in an annular groove (3b) of the joint housing (3).

In both cases, localizing can be supported by means of one or more retaining rings (5a, 5b)

Figure 2:
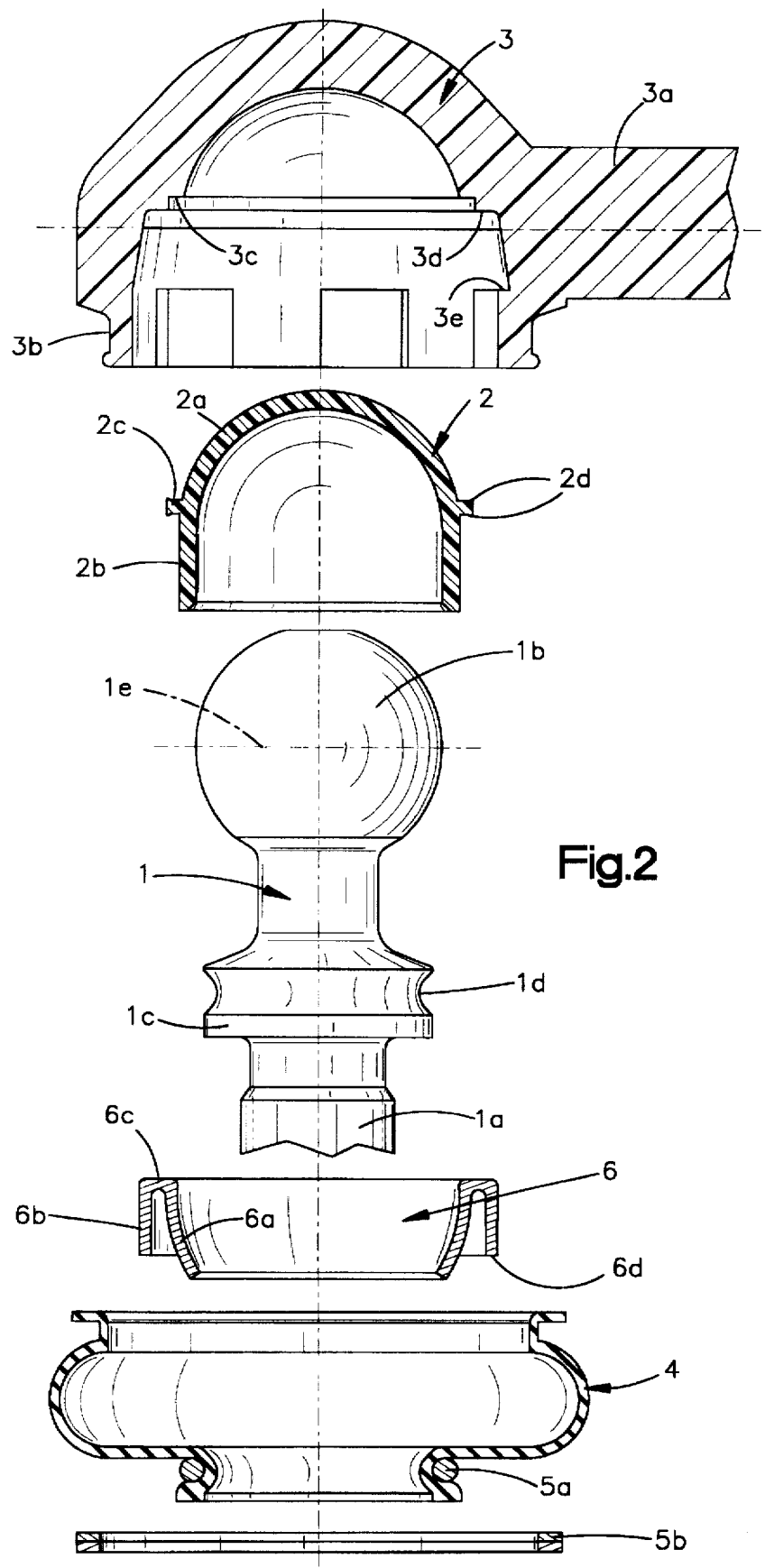
FIG. 2: The individual parts of a ball-and-socket joint in accordance with FIG. 1, in cross section.

In the starting state, the bearing shell (2), also produced of plastic, possesses the shape represented in FIG. 2, with a hemispherical upper section (2a) and, annexed to this upper section (2a), a lower section (2b) in the form of a cylindrical ring. The transition between upper section (2a) and lower section (2b) is located approximately in the region of the equator (1e) of the coupling ball (1b), which is shown in FIG. 2.

In the region of the transition between upper section (2a) and lower section (2b), the lateral area of the bearing shell (2) is provided with a flange ring (2c) which stands out in a radial sense, the upper and the lower sides of which, for the embodiment, are provided with a small bead (2d). The material of this bead (2d) is easily deformed and serves in this way to compensate for, e.g., existing tolerances when localizing the bearing shell (2) in the joint housing (3).

This localizing of the bearing shell (2), by means of its flange ring (2c), to an annular recess (3c) of the joint housing (3) is carried out by means of a lock ring (6), which is preferably produced of metal, but which also can be composed of a suitable plastic. The lock ring (6) has a double-leg cross section with a radial inner leg (6a) and a radial outer leg (6b), where the overall cross section can be of either U-shaped or V-shaped. For the embodiment represented in the figure, the lock ring (6) has a U-shaped cross section with a bridge (6c), from which the divergent legs (6a, 6b) start, as is particularly clear in FIG. 2.

In order to specify a precise seating of the lock ring (6) in the joint housing (3), the joint housing (3) is designed with an annular stop face (3d) for the crown or bridge area of the double-leg lock ring (6). This stop face (3d), along with the annular recess (3c) for the flange ring (2c) of the bearing shell (2,) is most easily recognized in FIG. 2.

Figure 3:
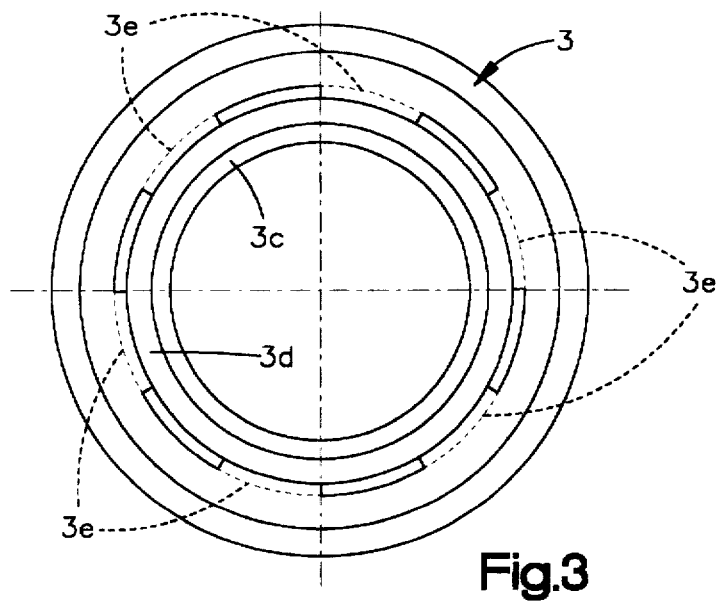
FIG. 3: A view of the joint housing from the side of the opening.

In addition, the joint housing (3), represented in cross section in FIG. 2, is provided with an approximately radial annular surface (3e), which is formed by means of an undercut in the joint housing (3). Both the cross-sectional representation in FIG. 2 as well as the view in FIG. 3 reveal that, for the embodiment, the annular surface (3e) is divided into several annular surface sections (3e') separately spaced, such that the undercuts can be produced without problem in an injection mold, e.g., by means of usual commercial sink cores or by means of the twisting of mold cores.

In order to assemble the ball-and-socket joint, the ball pivot (1), with bearing shell (2) placed on the coupling ball (1b), is introduced into the joint housing (3) until the flange ring (2c) of the bearing shell (2) is supported against the annular recess (3c) of the joint housing (3). In this connection, the cylindrical lower section (2b) of the bearing shell (2) stands out from the lower section of the coupling ball (1b).

The lock ring (6) is put in place until its bridge (6c) is supported against the stop face (3d) of the joint housing (3). In this connection, the radial inner leg (6a) of the lock ring (6) deforms the lower section (2b) of the bearing shell (2) in such a way that this lower section is also supported against that section of the coupling ball (1b) which extends between the equator (1e) of the coupling ball (1b) and the connected neck-shaped section of the ball pivot (1). The inner leg (6a) of the lock ring (6), which forms a support surface in the form of a ball race for the lower section (2b) of the bearing shell (2), consequently causes a reliable support of large surface area and localization of the coupling ball (1b) by means of the bearing shell (2).

In the assembled state, the edge (6d) of the free end of the radial outer leg (6b) of the lock ring (6) is supported by the annular surface (3e) or by the annular surface sections (3e') of the joint housing (3), as follows from FIG. 1. This cooperation between the edges (6d) of the free end of the outer leg (6b) and of the annular surface (3e) or annular surface sections (3e') of the joint housing (3) is achieved either with a leg (6b) which can be deformed elastically, by means of its resilient force, or with a leg (6b) which can undergo plastic deformation, by means of an expanding tool (W), which is indicated by a dashed line in FIG. 1 and, after the individual parts have been joined, is put in place in the interior of the lock ring (6).

As soon as the lock ring (6) assumes the position represented in FIG. 1, assembly of the ball-and-socket joint is completed. The edges (6d) of the end of the lock ring (6), supported against the annular surface sections (3e') produced by means of undercutting, represent a self-energizing retention for an axial tensile load of the ball pivot (1), since as a tensile load of this type increases, it strengthens the support of the lock ring (6), by means of the outer leg (6b) of the same, in the joint housing (3).

A sealing boot (4) can be subsequently mounted—if necessary, after the joint has been lubricated with grease—by inserting its border reinforcement on the housing side into the groove (3b) of the joint housing (3) and by inserting its border reinforcement on the spindle side into the channel (1d) of the ball pivot (1) and secured there, in each case, by means of a retaining ring (5a, 5b). The tilting range of the ball pivot (1) which is supported in a tilting sense such that it can be twisted and tilted to a limited extent, is indicated by the dashed line in FIG. 1.

List of reference numerals

| | |
|---|---|
| 1 | Ball pivot |
| 1a | Threaded stem |
| 1b | Coupling ball |
| 1c | Flange |
| 1d | Channel |
| 1e | Equator |
| 2 | Bearing shell |
| 2a | Upper section |
| 2b | Lower section |
| 2c | Flange ring |
| 2d | Bead |
| 3 | Joint housing |
| 3a | Undercarriage strut |
| 3b | Annular groove |
| 3c | Recess |
| 3d | Stop face |
| 3e | Annular surface |
| 3e' | Annular surface section |
| 4 | Sealing boot |
| 5 | Retaining ring |
| 6 | Lock ring |
| 6a | Inner leg |
| 6b | Outer leg |
| 6c | Bridge |
| 6d | Edge of the end |
| W | Expansion tool |

Having described the invention, the following is claimed:

1. A ball-and-socket joint for a motor vehicle, said ball-and-socket joint comprising:

a joint housing (3) having a chamber and an opening defined therein, said joint housing (3) including an arcuate inner surface means (3e) facing away from said opening into said chamber;

a ball pivot (1) having a coupling ball (1b), said coupling ball (1b) having an equator (1e);

a bearing shell (2) for receiving and supporting said coupling ball (1b), said bearing shell (2) being disposed in said chamber in said joint housing (3), said bearing shell (2) having an annular flange ring (2c) adjacent said equator (1e) of said ball pivot (1) and a first section (2b) between said equator (1e) and said opening in said joint housing (3); and a metal lock ring (6) for securing said bearing shell (2) in said chamber in said joint housing (3), said lock ring (6) having a U-shaped cross section with diverging inner and outer legs (6a, 6b) which extend from a bridge (6c), said inner leg (6a) of said lock ring (6) forming a support surface for said first section (2b) of said bearing shell (2), said outer leg (6a) of said lock ring (6) being supported at a terminal end (6d) by said arcuate inner surface means (3e) of said joint housing (3), said bridge (6c) of said lock ring (6) engaging said flange ring (2c) of said bearing shell (2) in said joint housing (3).

2. The ball-and-socket joint of claim 1 wherein said joint housing (3) includes an annular stop face (3d), said bridge (6c) of said lock ring (6) engaging said stop face (3d).

3. The ball-and-socket joint of claim 2 wherein said stop face (3d) is located adjacent said equator (1e).

4. The ball-and-socket joint of claim 1 wherein said outer leg (6b) of said lock ring (6) is elastically deformable.

5. The ball-and-socket joint of claim 1 wherein said outer leg (6b) of said lock ring (6) is plastically deformable.

6. The ball-and-socket joint of claim 1 wherein at least one side of said flange ring (2c) is provided with a tolerance compensating bead (2d).

7. The ball-and-socket joint of claim 1 wherein said joint housing (3) is made of plastic.

8. The ball-and-socket joint of claim 1 wherein said arcuate inner surface means (3e) of said joint housing (3) comprises a plurality of circumferentially spaced arcuate surface sections (3e').

* * * * *